United States Patent

Bahl et al.

Patent Number: 6,067,517
Date of Patent: May 23, 2000

[54] TRANSCRIPTION OF SPEECH DATA WITH SEGMENTS FROM ACOUSTICALLY DISSIMILAR ENVIRONMENTS

[75] Inventors: Lalit Rai Bahl, Amawalk; Ponani Gopalakrishnan, Yorktown Heights; Ramesh Ambat Gopinath, White Plains, all of N.Y.; Stephane Herman Maes, Danbury, Conn.; Mukund Panmanabhan, Ossining; Lazaros Polymenakos, White Plains, both of N.Y.

[73] Assignee: International Business Machines Corporation, Armonk, N.Y.

[21] Appl. No.: 08/595,722

[22] Filed: Feb. 2, 1996

[51] Int. Cl.$^7$ .................................................. G10L 15/20
[52] U.S. Cl. .......................................... 704/256; 704/242
[58] Field of Search ................................. 395/2.44, 2.52, 395/2.53, 2.86, 2.4, 2.79, 2.6, 2.64; 704/235, 236, 243, 244, 245, 251, 252, 255, 256, 257, 277, 276, 270, 278, 200, 242, 241

[56] References Cited

U.S. PATENT DOCUMENTS

| | | | |
|---|---|---|---|
| 4,430,726 | 2/1984 | Kasday | 395/2.44 |
| 5,333,275 | 7/1994 | Wheatley et al. | 395/2.52 |
| 5,579,436 | 11/1996 | Chou et al. | 395/2.53 |

FOREIGN PATENT DOCUMENTS

| | | | |
|---|---|---|---|
| 0645757 A1 | 3/1995 | European Pat. Off. | G10L 7/08 |
| 0649144 A1 | 4/1995 | European Pat. Off. | G11B 27/28 |
| WO 95/28700 | 10/1995 | WIPO | G10L 9/00 |

*Primary Examiner*—Richemond Dorvil
*Attorney, Agent, or Firm*—Ryan & Mason, L.L.P.; Paul J. Otterstedt

[57] ABSTRACT

A technique to improve the recognition accuracy when transcribing speech data that contains data from a wide range of environments. Input data in many situations contains data from a variety of sources in different environments. Such classes include: clean speech, speech corrupted by noise (e.g., music), non-speech (e.g., pure music with no speech), telephone speech, and the identity of a speaker. A technique is described whereby the different classes of data are first automatically identified, and then each class is transcribed by a system that is made specifically for it. The invention also describes a segmentation algorithm that is based on making up an acoustic model that characterizes the data in each class, and then using a dynamic programming algorithm (the viterbi algorithm) to automatically identify segments that belong to each class. The acoustic models are made in a certain feature space, and the invention also describes different feature spaces for use with different classes.

37 Claims, 5 Drawing Sheets

TRANSCRIPTION OF SPEECH DATA WITH SEGMENTS FROM ACOUSTICALLY DISSIMILAR ENVIRONMENTS

The invention was developed under US Government Contract number 33690098 "Robust Context Dependent Models and Features for Continuous Speech Recognition". The US Government has certain rights to the invention.

FIELD OF THE INVENTION

The invention relates to the transcription of data that includes speech in one or more environments and non-speech data.

BACKGROUND OF THE INVENTION

Speech recognition is an important aspect of furthering man-machine interaction. The end goal in developing speech recognition systems is to replace the keyboard interface to computers with voice input. To this end, several systems have been developed; however, these systems typically concentrate on improving the transcription error rate on relatively clean data in a controlled and steady-state environment, i.e., the speaker would speak relatively clearly in a quiet environment. Though this is not an impractical assumption for applications such as transcribing dictation, there are several real-world situations where these assumptions are not valid, i.e., the ambient conditions are noisy or change rapidly or both. As the end goal of research in speech recognition is the universal use of speech-recognition systems in real-world situations (for e.g., information kiosks, transcription of broadcast shows, etc.), it is necessary to develop speech-recognition systems that operate under these non-ideal conditions. For instance, in the case of broadcast shows, segments of speech from the anchor and the correspondents (which are either relatively clean, or have music playing in the background) are interspersed with music and interviews with people (possibly over a telephone, and possibly under noisy conditions).

A speech recognition system designed to decode clean speech could be used to decode these different classes of data, but would result in a very high error rate when transcribing all data classes other than clean speech. For instance, if this system were used to decode a segment with pure music, it would produce a string of words whereas there is in fact no speech in the input, leading to a high insertion error rate. One way to solve this problem is to use a "mumble-word" model in the speech-recognizer. This mumble-model is designed so that it matches the noise-like portion of the acoustic input, and hence can eliminate some of the insertion errors. However, the amount of performance improvement obtained by this technique is limited.

SUMMARY OF THE INVENTION

This invention describes an alternative way of dealing with the problem, where the first step is to automatically identify each of the distinct classes in the input, and then to use a different speech-recognizer to transcribe each of the classes of the input data. This significantly improves the performance on all data classes.

In accordance with the invention, each data class is transcribed by a system that is made up specifically for it. These systems are made by transforming the training data on which the speech-recognition system is trained, so that it matches the acoustic environment of the class. For instance, the main characteristic of telephone speech is that it is band-limited from 300–3700 Hz, whereas the clean training data has a higher bandwidth. So in order to transform the training data to better match the telephone-quality speech, the training data is band-limited to 300–3700 Hz, and the speech-recognition system is trained using this transformed data. Similarly, for the case of music-corrupted speech, pure music is added to the clean training data and the speech-recognition system is trained on the music-corrupted training data.

Thus, the invention describes a technique to improve the recognition accuracy when transcribing speech data that contains data from a wide range of environments, as for example broadcast news shows. This segmentation procedure does not require a script for the speech data and is hence unsupervised. Broadcast news shows typically contain data from a variety of sources in different environments. A broad (and the most important) categorization of speech data yields the following classes: clean speech, speech corrupted by noise (for broadcast news this could be music playing in the background), pure noise (or music) with no speech, interviews conducted over the telephone, and finally speech in a non-stationary noisy environment. Typically, speech recognition systems are trained on clean speech; however, if this system is used to decode the data from the other classes, it results in very poor recognition performance.

In accordance with the invention, different classes of data are first automatically identified, and then each class is transcribed by a system that is made specifically for it. The invention also describes a segmentation algorithm that is based on making up an acoustic model that characterizes the data in each class, and then using a dynamic programming algorithm (the viterbi algorithm) to automatically identify segments that belong to each class. The acoustic models are made in a certain feature space, and the invention also describes different feature spaces for use with different classes.

BRIEF DESCRIPTION OF THE DRAWINGS

FIG. 7($b$) is a flow diagram describing a segmentation procedure in accordance with one aspect of the invention.

DETAILED DESCRIPTION OF THE INVENTION

We describe a technique to improve the recognition accuracy when transcribing speech data that contains data from a wide range of environments, such as broadcast news shows. The specific classes considered here pertain to the broadcast news show, but similar techniques can be used to deal with other situations that include speech from several environments and non-speech sounds. Broadcast news shows typically contain data from a variety of sources in different environments, and a broad categorization of these types is as follows: clean speech, speech corrupted by music playing in the background, pure music with no speech, interviews conducted over the telephone, and finally speech in a non-stationary noisy environment. It is possible to further differentiate sub-categories in the above categories, for instance, the clean speech class could be further categorized based on the speaker identity, or alternate types of microphones etc. However, the above described categories are the most important in the sense that the above categorization is sufficient to provide a significant performance improvement.

In accordance with the invention, the input speech is converted to a stream of feature vectors in time, $s_1, \ldots, s_T$, and the objective now is to assign each feature vector to one of the classes mentioned earlier. Further, as successive feature vectors are extracted from the input at very short time intervals (10 ms or so), it is likely that a contiguous segment of feature vectors would be assigned the same tag. In the implementation described here, it is also possible to ensure this constraint, i.e. that the length of a contiguous set of feature vectors that are assigned the same tag is at least larger than a certain minimum length. It is assumed that the training data is labelled, i.e., every one of the stream of feature vectors representing the training data has been tagged with a class id, and further, that there is sufficient data for each class to enable a model to be made for the class.

Figure 1:
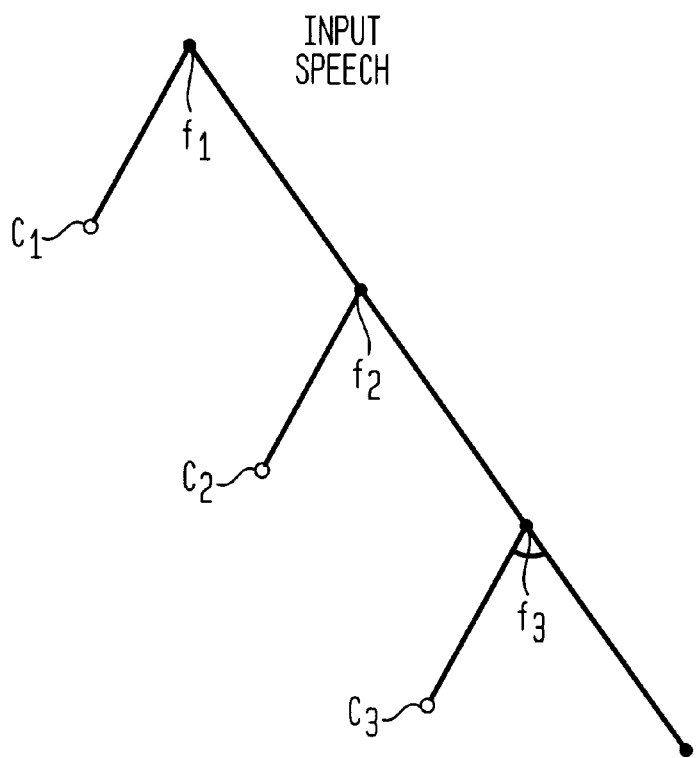
FIG. 1 is a linear segment classification tree for use with the invention.

One of the problems here is to find a feature vector based on which different classes can be easily differentiated, and this feature vector may be different from that used for the speech recognition process. It may also be the case that different feature vectors are needed to isolate different classes. For such circumstances, it is easier to organize the segmentation in the hierarchy of a tree as shown in FIG. 1, where data from a single class is identified at each level of the tree. This also allows for the possibility of using different feature vectors at different levels in the tree. For instance, in FIG. 1, the feature vector $f_1$ is used to identify segments that belong to class $c_1$, $f_2$ is used to identify segments belonging to class $c_2$ and so on.

The manner in which the segmentation is carried out at each level of the tree is as follows: at each level of the tree, a binary decision is made for every feature vector in the input stream, i.e., whether the feature vector belongs to a specific class or not. In order to do this, the first step is to generate models that represent the distribution of the feature vector for each class. This can be done by taking the feature vectors in the training data that have tags corresponding to the class, and clustering them to form a model $M_c$ comprising a mixture of gaussian distributions, $G_{c,i}$, i=1, ..., $k_1$, where $\mu_{c,1}, \lambda_{c,1}$ represent the means and covariance matrices of the Gaussians. The same procedure can be used to generate a model, $M_{\bar{c}}$, for data that does not belong to the class. Let $G_{\bar{c},i}$, i=1, ..., $k_2$ represent the Gaussians in this mixture, and $\mu_{\bar{c},i}, \lambda_{\bar{c},i}$ represent the means and covariance matrices of these Gaussians.

Figure 2:
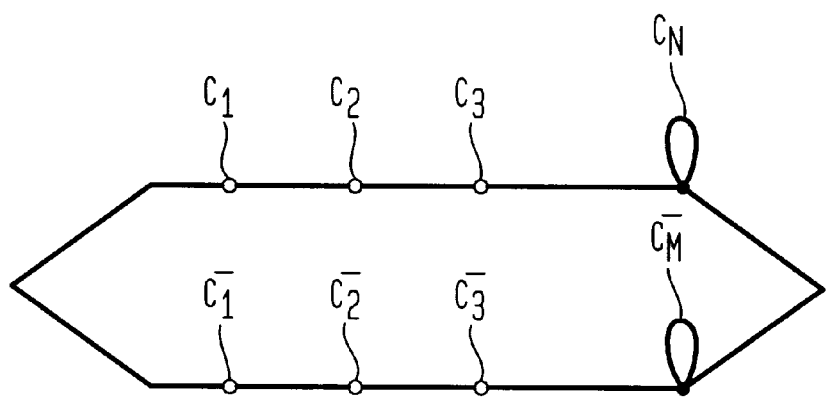
FIG. 2 is a Hidden Markov Model classifier for use with the invention.

The underlying assumption now is that the input feature vector was produced by one of these models, and the task is to assign it the tag of the model that gives it the highest probability. The probability of the input feature vector $x_t$ belonging to the specified class is given by $P(x_t/M_c)$ and the probability of its not belonging to the class is given by $P(x_t/M_{\bar{c}})$. Further, we would also like to impose the minimum length constraint mentioned earlier, i.e., that number of contiguous feature vectors that are assigned the same tag has to be at least more than a specified minimum. This can be done by assuming a hidden markov model (HMM) for the generation of the input data as shown in FIG. 2. The upper path in the model corresponds to the input data belonging to the specified class, and the probability distribution of the arcs $c_1-c_n$ is given by $M_c$. The lower path corresponds to the input data not belonging to the specified class, and the probability distribution of the arcs $\bar{c}_1-\bar{c}_M$ is given by $M_{\bar{c}}$. The minimum lengths of the two paths, N and M, constrain the number of contiguous feature vectors that are assigned either to the class or not to the class to be greater than M and N, respectively. The viterbi algorithm is used to trace a path through the trellis corresponding to the model in FIG. 2, and to assign a class-ID c or $\bar{c}$ to contiguous sets of the input feature vectors.

To deal with broadcast news, the first level of the tree in FIG. 1 was used to isolate pure music segments from the remainder of the data. Note that so far, we have not specified the feature vector $f_1$ that is to be used in the procedure described above. There are several features that characterize music, and any one of these, or a combination, could be used to form the feature vector $f_1$ of FIG. 1.

A window of the input speech is taken every 10 ms (referred to as a frame) and a feature vector is produced for every frame. Usually the first step in the process of extracting a feature vector is the computation of the energy or the log of the energy in logarithmically spaced frequency bands. One of the characteristics of music is that it tends to have approximately equal energy in each band. Hence one feature that could be used to characterize music is the variance of the energy across the different bands in a frame. Another feature that tends to distinguish music from speech is the behavior of the pitch of the signal. The pitch for a speech signal tends to show a large variation about the mean value, whereas the pitch for a music signal tends to be relatively constant in time. Hence, another feature that could be used to distinguish speech from music is the mean and variance of the pitch over time. A third possibility for a feature is the cepstra, or a linear combination of the cepstra for several frames. (The cepstra are obtained by applying the Discrete Fourier Transform to a vector whose elements comprise the energies in the log-spaced frequency bands). Yet another possibility is to start with a combination of the above features and then compute a linear discriminant (see P. O. Duda and P. E. Hart, Pattern Classification and Scene Analysis, Wylie, N.Y., 1973) to separate out music and speech (as there are only two classes that need to be distinguished, only one discriminant vector can be found that separates the two classes maximally).

After the pure music segments have been removed, the next level in FIG. 1 separates telephone speech from regular speech. As mentioned earlier, telephone speech is characterized by having a bandwidth of 300–3700 Hz, whereas regular clean speech has a much larger bandwidth (eg. 0–8000 Hz). Hence, the ratio of energy in the 300–3700 Hz frequency band, to the energy outside this band could be used as a feature that would help to isolate telephone and regular speech. Alternate or additional possibilities include the cepstra, and linear discriminants, as mentioned above for the case of pure music.

The third level in the tree of FIG. 1 isolates clean speech from speech in a noisy background. One of the features that characterizes speech is a large variation in its energy across time, whereas noisy speech shows much less of a variation. Hence, a possible feature for separating clean and noisy speech is the variance of the energy across time. As in earlier cases, alternate or additional possibilities include the cepstra and linear discriminants.

Figure 3:
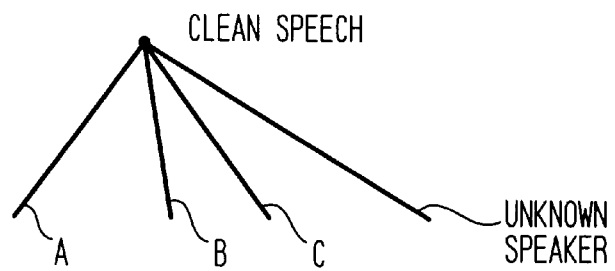
FIG. 3 is a parallel segment classification tree for use with the invention.

Once the clean speech segments have been identified, it is possible to try and classify them further by the identity of the speaker, or the type of microphone being used, etc. The segmentation procedure used here is identical to that used in the earlier hierarchy of the tree, with the difference that the split at this stage is no longer binary. For instance, if it is desired to categorize the clean speech as one of speakers A, B, C or an unknown speaker, then the hierarchy of the tree would be as shown in FIG. 3, and the underlying HMM would be as shown in FIG. 4B. Hence, the arcs labelled $a_1-a_m$ have a probability distribution that characterizes speaker A, $b_1-b_n$ have a probability distribution that characterizes speaker B, and so on, and $d_1-d_p$ have a probability distribution that characterizes the unknown speaker, that represents a speaker-independent model.

If a transcription is available for the clean speech that is to be segmented, then it is possible to use it to further improve the segmentation. In this case, the model for each speaker is made up by combining a number of sub-models where each sub-model characterizes the pronunciation of a phonetic class by the speaker. For instance, if there are K phonetic classes, each speaker model $M_s$ is composed of a mixture of sub-models (an example of a sub-model is a Gaussian), each sub-model corresponding to a phonetic class.

The input speech is first viterbi aligned (see A. J. Viterbi, "Error Bounds for Convolutional Codes and An Asymptotically Optimal Decoding Algorithm", IEEE Trans. on Info. Theory, vol IT-13, pp. 260–69, April 1967) against the given script using a speaker independent model in order to assign a phonetic tag to each feature vector and to isolate regions of silence. The task of the segmenter now is to assign a speaker id tag to the speech segments between two silence regions, given the phonetic tag of every feature vector in the segment.

Figure 4A:
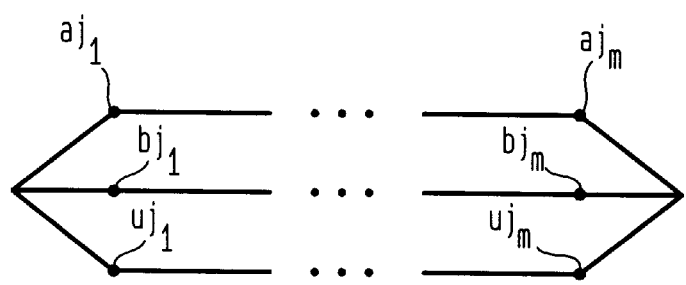
FIGS. 4A and 4B are Hidden Markov Models for classifying segmented speech as corresponding to one of a plurality of known speakers, in accordance with the invention.
Figure 4B:
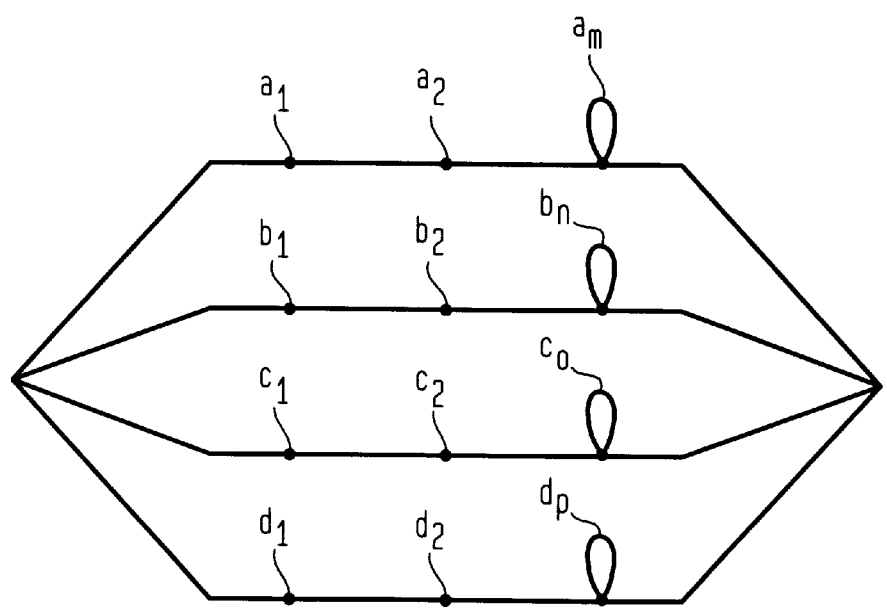

The acoustic model for assigning a speaker id tag to the segment between two consecutive silence regions is shown in FIG. 4A. There, it is assumed that the length of the segment between the two silences is M, and the phonetic tags assigned to the feature vectors are $j_i, \ldots, j_M$. The likelihood of a feature vector is computed given the sub-model of the speakers corresponding to the phonetic class that was assigned to the feature vector, for instance $j_1$ is the segment, and $a_{j1}, b_{j1}, \ldots, u_{j1}$ represent the sub-models of the various speakers for the phonetic class $j_1$.

Once the input speech has been segmented into the desired classes, the next step is to transcribe each segment with a speech recognizer that was made specifically for it. These systems are made by transforming the training data on which the speech-recognition system is trained, so that it matches the acoustic environment of the class. For instance, the main characteristic of telephone speech is that it is band-limited from 300–3700 Hz, whereas the clean training data has a higher bandwidth. So in order to transform the training data to better match the telephone-quality speech, the training data is band-limited to 300–3700 Hz, and the speech-recognition system is trained using this transformed data. Similarly, for the case of music-corrupted speech, pure music is added to the clean training data and the speech-recognition system is trained on the music-corrupted training data.

Figure 5:
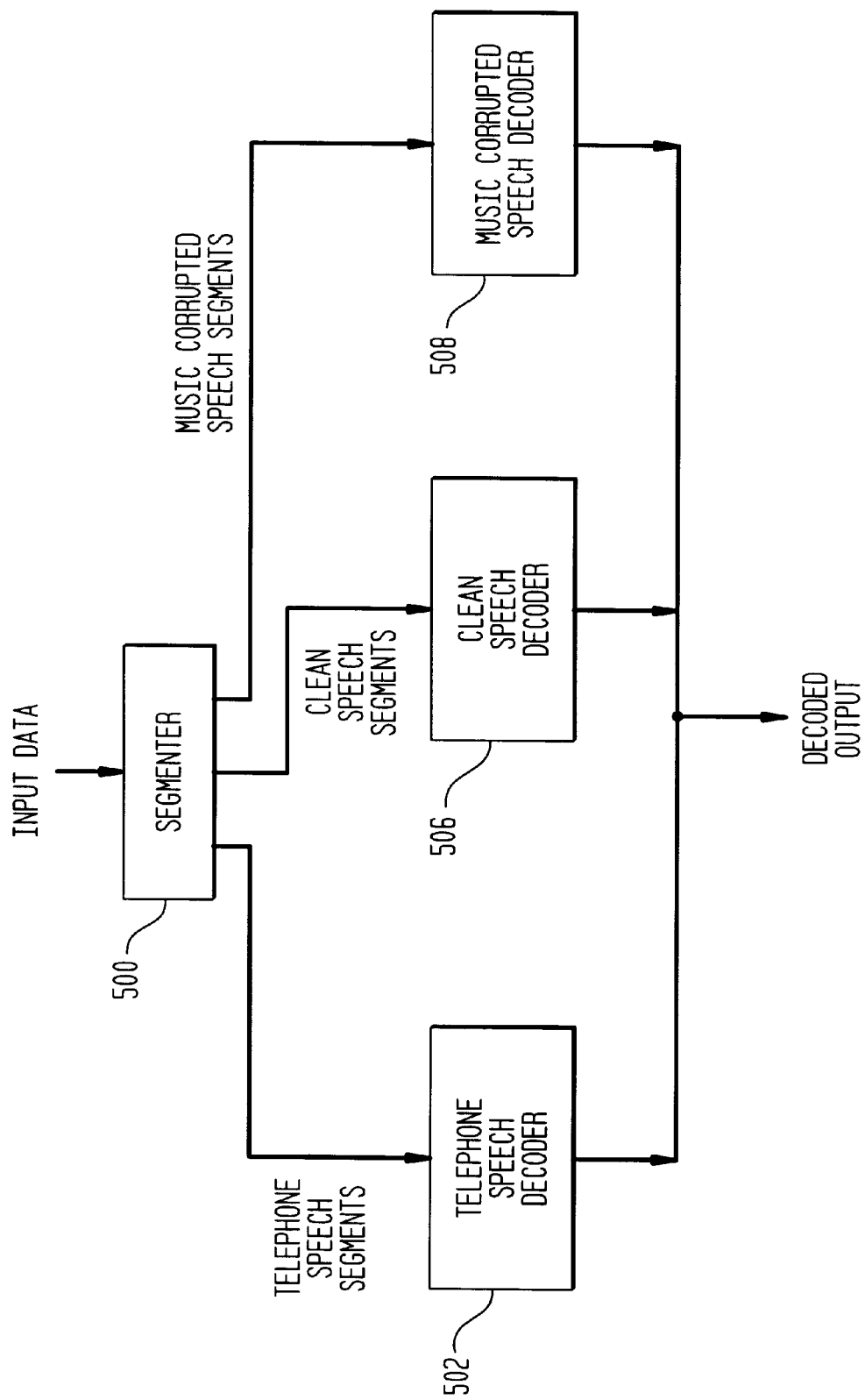
FIG. 5 is a system block diagram of the invention.

FIG. 5 is a block diagram of a system in accordance with the present invention. The invention can be implemented on a general purpose computer programmed to provide the functional blocks shown in FIG. 5. In FIG. 5, the input data, which can include clean speech, music-corrupted speech, pure music and/or telephone speech, is input to a segmenter 500. The segmenter segments the input data into segments classified as one of the foregoing types of input data. Each segment is then directed to a decoder corresponding to the its type: telephone speech segments to telephone speech decoder 502; clean speech to clean speech decoder 506; and music corrupted speech to music corrupted speech decoder 508. Each of decoders 502, 506 and 508 produces a decoded output of the input segment, and these outputs are presented as the decoded output of the system. In the case of pure music, no decoded output is in fact produced, since no speech data is contained therein for decoding.

Figure 6:
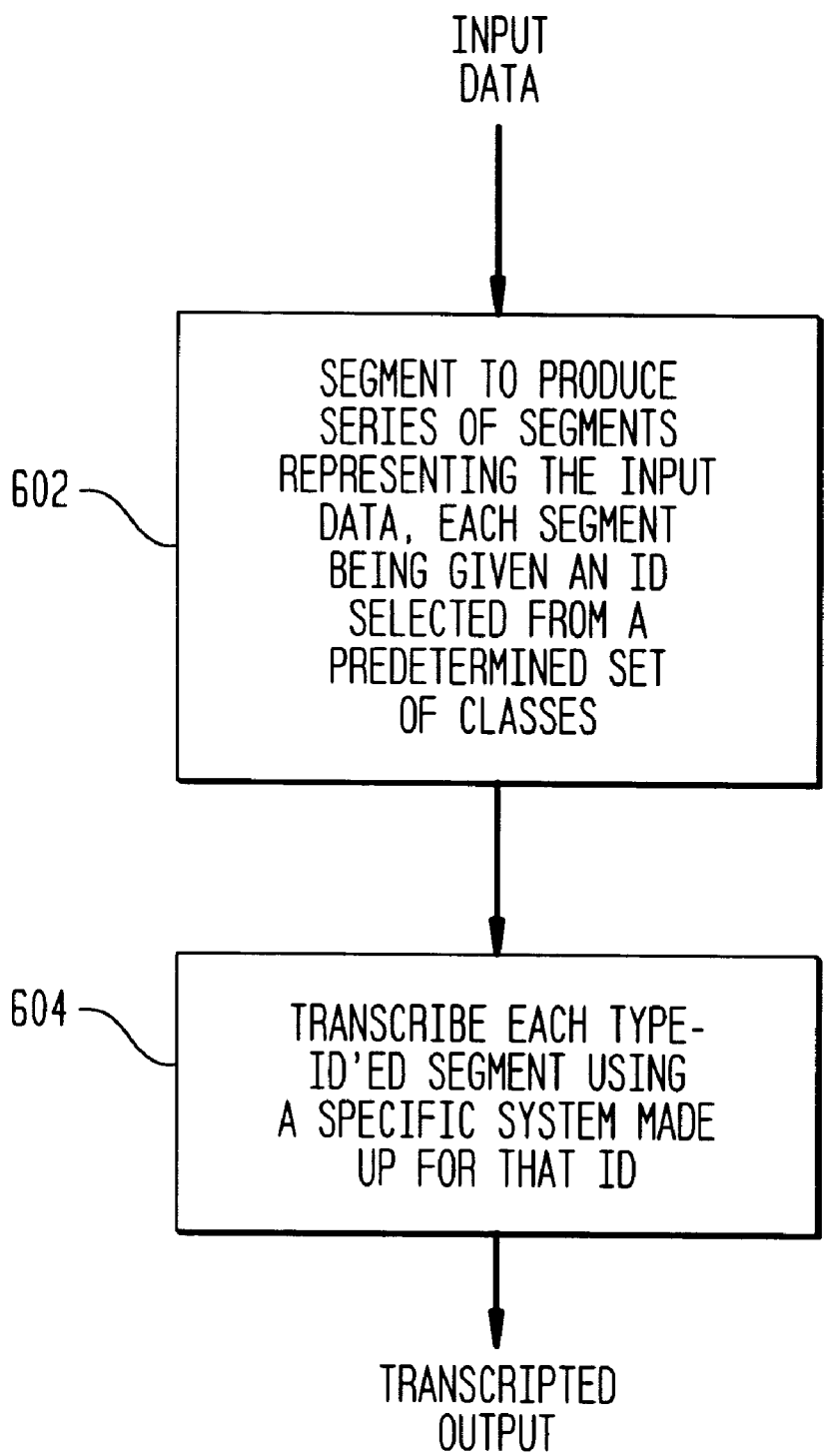
FIG. 6 is a flow diagram of one embodiment of the method of the invention.

FIG. 6 shows a flow diagram of the steps of one embodiment of the present invention. Again, these steps can be implemented on a general purpose computer programmed in accordance with the details set forth herein. The first step of the process as shown in FIG. 6 is to provide input data that may contain pure music, music corrupted speech, telephone speech and/or clean speech. This input is segmented in step 602 to produce a series of segments representing the input data, each segment being given an ID selected from a predetermined set of ID's: pure music, music corrupted speech, telephone speech and/or clean speech. The segments are then decoded and transcribed in step 604 using a particular decoding means tailored to the particular type of data. The result of this operation is presented as the decoded output.

A further aspect of the invention allows for the segmentation of speech utterances on the basis of the speaker. In other words, under stationary conditions of noise and channel, the method can segment input speech according to the identity of the speakers. It is not necessary that the speakers be known in advance. The number of speakers may also be unknown. If the channel or the background noise changes (i.e. music appears), the method can also segment accordingly. Thus, this aspect of the invention allows unsupervised segmentation of speech utterances on the basis of the speaker channel and background. It does not require any a-priori information about the signal, but can easily use any such information. It is a fast method which does not require any actual speech recognition phase in order to make a decision. This aspect of the invention also regroups the different segments which present the same characteristics (i.e. same speaker through same channel and with similar background), so that systems can be trained on line to the specificity of each class of segments.

Figure 7A:
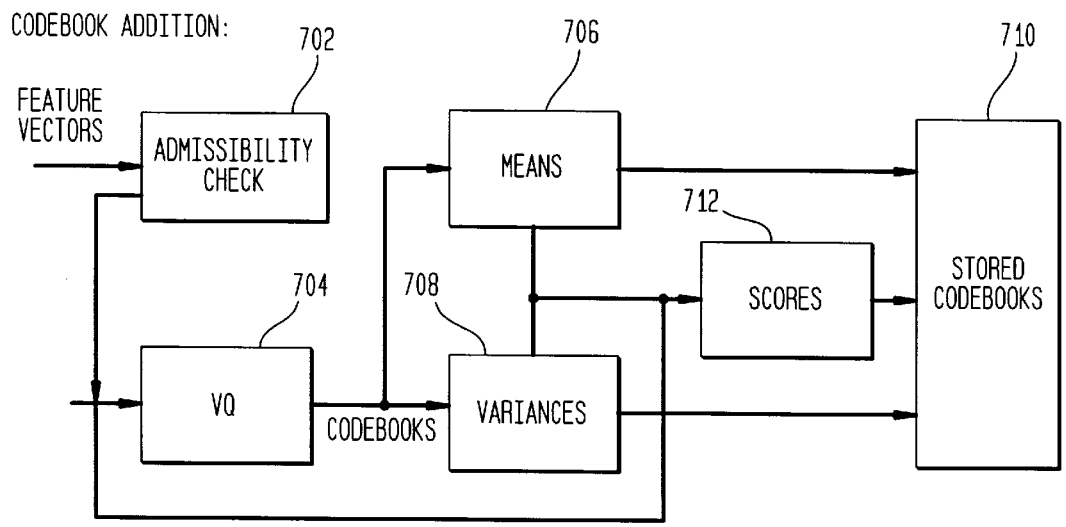
FIG. 7($a$) is a flow diagram illustrating the addition of codebooks in accordance with one aspect of the invention.
Figure 7B:
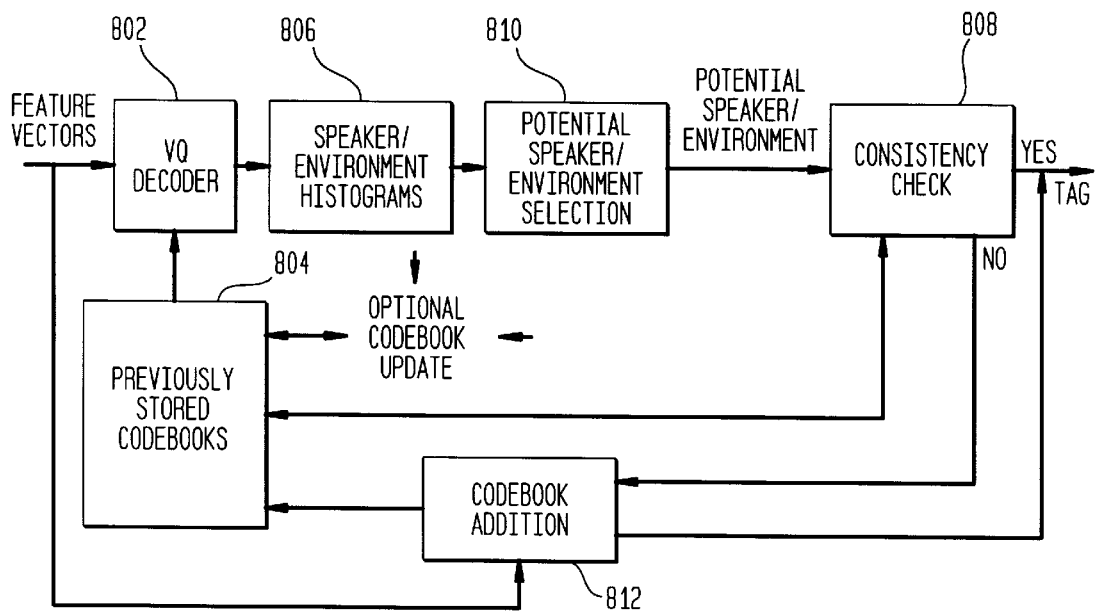

FIG. 7(a) illustrates a method in accordance with this aspect of the invention that allows the addition of new codebooks to an existing system. The admissibility check 702 selects feature vectors that are not confusable with existing codebooks. The feature vectors are then vector quantized at step 704, and the resulting codebooks passed to blocks 706 and 708, where the means and variances are computed, respectively. The means and variances are then stored at block 710. An account of all feature vectors that are outside the means and variances of a particular codebook are maintained in scores block 712. If the number such vectors exceeds a predetermined threshold, the feature vector is discarded. FIG. 7(b) describes the procedure for testing. Each frame is decoded at step 802 with the set of codebooks currently existing, using input from block 804. A set of histograms is then generated at block 806, and these histograms are used to select a codebook at step 810. The histograms represent the number of feature vectors in the test speech that match-up with each codebook. The potential codebook is checked for consistency (ratios of distances to codewords to the variances of these codewords) at step 808. If the selection is acceptable, the frames are tagged by a codebook index. It is optional to use the data to update the associated frames. In general, stability suggests not to use more than 10 seconds worth of data to define a codebook. If the consistency test fails, a new codebook is added to the set using admissible frames at step 812. Note that the method not only segments the files when there is a change of speaker, but it can also regroup segments associated with a particular speaker (or under similar conditions).

Because no information is known about the speakers, there is no training phase required in this aspect of the invention. However, because some thresholds are required, these thresholds are established prior to testing, using similar data. The threshold selection can be done by trial and error.

Of course, if any a-priori information is known, it can be incorporated in the codebook. For example, if some speakers are known, their models can be loaded in advance and only new speakers will be subsequently added to the database. If music is suspected in the background, codebooks can be built with pure speech, pure music and different types of music plus speech.

The above segmentation is done in an un-supervised way and independently of any speech recognition.

In the preferred configuration, the feature vectors (obtained as output of the acoustic front-end) are the MEL cepstra, delta and delta—delta (including C0 (energy)). They are 39 dimension vectors. The features are usually computed on frames of 30 ms with shifts of 10 ms. Note that it is purely a function of the speech recognizer for which model prefetching is implemented. If other feature vectors (like LPC cepstra) are used, the feature vector used by the segmenter can be LPC cepstra. However, the efficiency of the segmenter depends on the set of features used. Of course, it is always possible to use different feature sets for the recognizer and the segmenter.

The segmenter system stores a minimum of information about each type of segment: for example, a codebook of 65 codewords (although the number of codewords is not critical), their variances and some optional scores obtained during enrollment. In particular, it is not necessary to store the training utterances.

Once a codebook is finally selected, the system can tag the associated frames accordingly.

Segmentation is performed using a generalized vector quantization algorithm.

When a new codebook is added to the database, the feature vectors selected as admissible are clustered in a set of, for example, 65 codewords. The variance of each cluster is also stored. Eventually, some additional scores are stored for each codeword, including, the number of feature vectors associated with this codeword while being far apart from it. Two distances can be used: a Mahalanobis distance which is a euclidian distance with weights that are the inverse of the variances of each dimension of the feature vector (These weights can be decided a-priori based on the data used to train the speech recognition application or on the fly on the training and/or testing data), or a probabilistic distance where the distance is the log-likelihood of the Gaussian associated with the codeword (same means and variances). Typically, 10 seconds of speech are used for training. Feature vectors are considered admissible if they are not confusable with existing codewords. This means that some vectors too close to existing codewords are rejected during clustering. If this is not done, instabilities will occur due to overlapping of clusters.

During testing, or actual use of the system, the feature vectors are obtained from the acoustic front-end. After about three seconds of speech, a candidate tag will begin to emerge. After about 5 to 10 seconds, a final decision is made. The testing is implemented as a generalized VQ decoder. On a frame by frame basis, it identifies the closest codebook (or ranks the N closest). A histogram is then created which counts how many frames have selected each codebook. The codebook which was most often selected identifies the potential tag.

At this stage, the segmenter checks if the potential tag is a consistent choice. If it is not, a new codebook is added using admissible frames. The consistency is checked based on different tests. Firstly, the histogram is inspected. A clear maxima indicates a good chance that the choice is correct. If a set of competing codebooks emerges, tests on the variances are more critical. The test of variances are defined as follows: for each feature vector, its distance to the selected codeword or the competing codewords are compared to their associated variances. If the distances are too large given the associated scores, the codebook is rejected. If no codebook is eventually accepted, none is identified and a new codebook must be built. If one codebook remains acceptable, then it identifies the tag.

While the invention has been described in particular with respect to specific embodiments thereof, it will understood that modifications to these embodiments can be effected without departing from the spirit and scope of the invention.

What is claimed is:

1. A method for transcribing a segment of data that includes speech in one or more environments and non-speech data, comprising:

inputting the data to a segmenter and producing a series of segments, each segment being given a type identifier tag selected from a predetermined set of classes; and transcribing each type identifier tagged segment using a specific system created for that type.

2. The method of claim 1, wherein the step of segmenting comprises:

identifying a number of classes that the acoustic input can be classified into that represent the most acoustically dissimilar classes possible.

3. The method of claim 2, wherein the classes include non-speech, telephone speech, noise-corrupted speech, and clean speech.

4. The method of claim 3, wherein the non-speech class includes music.

5. The method of claim 3, wherein the noise-corrupted speech includes music.

6. The method of claim 2, wherein the step of giving a type identifier tag comprises:

assuming that the input data is produced by a parallel combination of models, each model corresponding to one of the predetermined classes;

the identifier tag assigned to a segment being the class identifier tag of the model that gives the segment the highest probability, subject to certain constraints.

7. The method of claim 1, further comprising creating a system for transcribing data from each class.

8. The method of claim 1, wherein the classes include the identity of a speaker.

9. The method of claim 1, wherein one of the classes in the predetermined set of classes is a speaker identification class.

10. The method of claim 9, wherein the speaker identification classes are not known a priori and are determined automatically based on updating classes corresponding to the speakers.

11. The method of claim 9, wherein the speaker identification classes further comprise varying background environments, wherein speaker identification classes are determined in light of those varying environments.

12. A method for transcribing a segment of data that includes speech in one or more environments and non-speech data, comprising:

inputting the data to a segmenter and producing a series of segments, each segment being given a type identifier tag selected from a predetermined set of classes, wherein it is assumed that the input data is produced by a parallel combination of models, each model corresponding to one of the predetermined classes, the identifier tag assigned to a segment being the class identifier tag of the model that gives the segment the highest probability, subject to certain constraints, wherein one of the constraints is a minimum duration on the segment, and wherein a number of classes that the acoustic input can be classified into are identified that represent the most acoustically dissimilar classes possible; and transcribing each type identifier tagged segment using a specific system created for that type.

13. A method for transcribing a segment of data that includes speech in one or more environments and non-speech data, comprising:

inputting the data to a segmenter and producing a series of segments, each segment being given a type identifier tag selected from a predetermined set of classes using a binary tree hierarchy, wherein at each level of the tree, segments corresponding to one of the predetermined classifications are isolated, and wherein a number of classes that the acoustic input can be classified into are identified that represent the most acoustically dissimilar classes possible; and transcribing each type identifier tagged segment using a specific system created for that type.

14. A method for transcribing a segment of data that includes speech in one or more environments and non-speech data, comprising:

inputting the data to a segmenter and producing a series of segments, each segment being given a type identifier tag selected from a predetermined set of classes, wherein segmentation is carried out using a Hidden Markov Model to model each class and the viterbi algorithm to isolate and assign type identifier tags to the segments; and transcribing each type identifier tagged segment using a specific system created for that type.

15. A method for transcribing a segment of data that includes speech in one or more environments and non-speech data, comprising:

inputting the data to a segmenter and producing a series of segments, each segment being given a type identifier tag selected from a predetermined set of classes, wherein it is assumed that the input data is produced by a parallel combination of models, each model corresponding to one of the predetermined classes, the identifier tag assigned to a segment being the class identifier tag of the model that gives the segment the highest probability, subject to certain constraints, wherein a number of classes that the acoustic input can be classified into are identified that represent the most acoustically dissimilar classes possible and, wherein the process of creating the models comprises identifying a feature space for the individual predetermined classes; and transcribing each type identifier tagged segment using a specific system created for that type.

16. The method of claim 15, wherein the feature space for the model for non-speech is created by:

taking a window of input speech every 10 milliseconds and computing a vector comprising the energy or log energy in logarithmically spaced frequency bands on that window, the feature being the variance across the dimensions of the vector.

17. The method of claim 15, wherein the feature space for the model for non-speech is created by:

taking a window of input speech every 10 milliseconds and computing the log of the energy in logarithmically spaced frequency bands;

computing the cepstra from this vector, the feature being the cepstra.

18. The method of claim 15, wherein the feature space for the model for non-speech is created by:

taking a window of input speech every 10 milliseconds and computing the log of the energy in logarithmically spaced frequency bands;

computing a linear discriminant to separate out non-speech and speech.

19. The method of claim 15, wherein the feature space for the model for non-speech is created by:

taking a window of input speech every 10 milliseconds and computing the log of the energy in logarithmically spaced frequency bands;

computing the variance across the dimensions of the vector, the cepstra of vector and a linear discriminant;

wherein the feature is the variance across the dimensions of the vector, the cepstra of the vector or a linear discriminant.

20. The method of claim 15, wherein the feature space for the model for non-speech is created by:

taking a window of input speech every 10 milliseconds and computing the pitch;

wherein the feature is the mean and the variance of the pitch across a plurality of consecutive windows.

21. The method of claim 15, wherein the feature space for the model for telephone speech is created by:

taking a window of input speech every 10 milliseconds;

computing a ratio of the energies in the telephone frequency band (300–3700 Hz) to the total energy of the signal.

22. The method of claim 15, wherein the feature space for the model for telephone speech is created by:

taking a window of input speech every 10 milliseconds and computing the log of the energy in logarithmically spaced frequency bands;

computing the cepstra from this vector, the feature being the cepstra.

23. The method of claim 15, wherein the feature space for the model for telephone speech is created by:

taking a window of input speech every 10 milliseconds and computing the log of the energy in logarithmically spaced frequency bands;

computing a linear discriminant to separate telephone speech and non-telephone speech.

24. The method of claim 15, wherein the feature space for the model for clean speech is created by:

taking a window of input speech every 10 milliseconds;

computing the energy in the window, wherein the feature is related to the variation of energy across a plurality of consecutive windows.

25. The method of claim 15, wherein the feature space for the model for clean speech is created by:
  taking a window of input speech every 10 milliseconds and computing the log of the energy in logarithmically spaced frequency bands;
  computing the cepstra from this vector, the feature being the cepstra.

26. The method of claim 15, wherein the feature space for the model for clean speech is created by:
  taking a window of input speech every 10 milliseconds and computing the log of the energy in logarithmically spaced frequency bands;
  computing a linear discriminant to separate out clean speech and noisy speech.

27. A method for transcribing a segment of data that includes speech in one or more environments and non-speech data, comprising:
  inputting the data to a segmenter and producing a series of segments, each segment being given a type identifier tag selected from a predetermined set of classes, wherein the classes include non-speech, telephone speech, noise-corrupted speech, and clean speech, and wherein clean speech segments are further segmented into smaller segments that can be assigned a speaker identifier tag; and
  transcribing each type identifier tagged segment using a specific system created for that type.

28. The method of claim 27, further comprising providing a script to allow supervised speaker identification and thereby improve the speaker identifier segmentation.

29. The method of claim 28, wherein the models for the training speakers are generated by combining sub-models that correspond to each phonetic or sub-phonetic class.

30. The method of claim 28, wherein first the clear speech is viterbi aligned against the given script, using speaker independent models, to identify regions of silence and to tag every feature vector between two consecutive silence regions with the identifier tag of a phonetic or sub-phonetic class.

31. The method of claim 30, wherein a speaker identifier tag is assigned to a speech segment between two consecutive silences, where the likelihood of each feature vector is computed given each speaker model for the sub-phonetic class that was assigned to that feature vector.

32. The method of claim 27, wherein the procedure for segmenting is carried out using a parallel technique using a word transcription for the clean speech.

33. A method for transcribing a segment of data that includes speech in one or more environments and non-speech data, comprising:
  inputting the data to a segmenter and producing a series of segments, each segment being given a type identifier tag selected from a predetermined set of classes, wherein the classes include non-speech, telephone speech, noise-corrupted speech, and clean speech; and
  transcribing each type identifier tagged segment using a specific speech recognition system created for that type, wherein setting up a system for transcribing telephone speech comprises transforming the training data from which the speech recognition system was made so that it matches the acoustic environment of telephone speech, wherein the transformation comprises band limiting the training data to telephone bandwidths.

34. A method for transcribing a segment of data that includes speech in one or more environments and non-speech data, comprising:
  inputting the data to a segmenter and producing a series of segments, each segment being given a type identifier tag selected from a predetermined set of classes, wherein the classes include non-speech, telephone speech, noise-corrupted speech, and clean speech; and
  transcribing each type identifier tagged segment using a specific speech recognition system created for that type, wherein setting up a system for transcribing noise-corrupted speech comprises transforming the training data from which the speech recognition system was made so that it matches the acoustic environment of noise-corrupted speech, wherein the transformation comprises adding pure noise to the clean speech in the training data.

35. The method of claim 34, wherein the noise includes music.

36. A system for transcribing a segment of data that includes speech in one or more environments and non-speech data, comprising:
  means for inputting the data to a segmenter and producing a series of segments, each segment being given a type identifier tag selected from a predetermined set of classes; and
  means for transcribing each type identifier tagged segment using a specific system created for that type.

37. Apparatus for transcribing a segment of data that includes speech in one or more environments and non-speech data, the apparatus comprising:
  a segmenter which produces a series of segments from the data, each segment being given a type identifier tag selected from a predetermined set of classes; and
  a plurality of speech recognizers coupled to the segmenter which are specifically created for each type and which respectively transcribe segments having corresponding type identifier tags.

* * * * *

UNITED STATES PATENT AND TRADEMARK OFFICE
CERTIFICATE OF CORRECTION

PATENT NO : 6,067,517
DATED : May 23, 2000
INVENTOR(S): L.R. Bahl et al.

It is certified that error appears in the above-identified patent and that said Letters Patent are hereby corrected as shown below:

On the title page, item [75] fifth inventor:

"Panmanabhan" should be --Padmanabhan--.

Signed and Sealed this

Twenty-second Day of May, 2001

Attest:

NICHOLAS P. GODICI

*Attesting Officer*     Acting Director of the United States Patent and Trademark Office